UNITED STATES PATENT OFFICE.

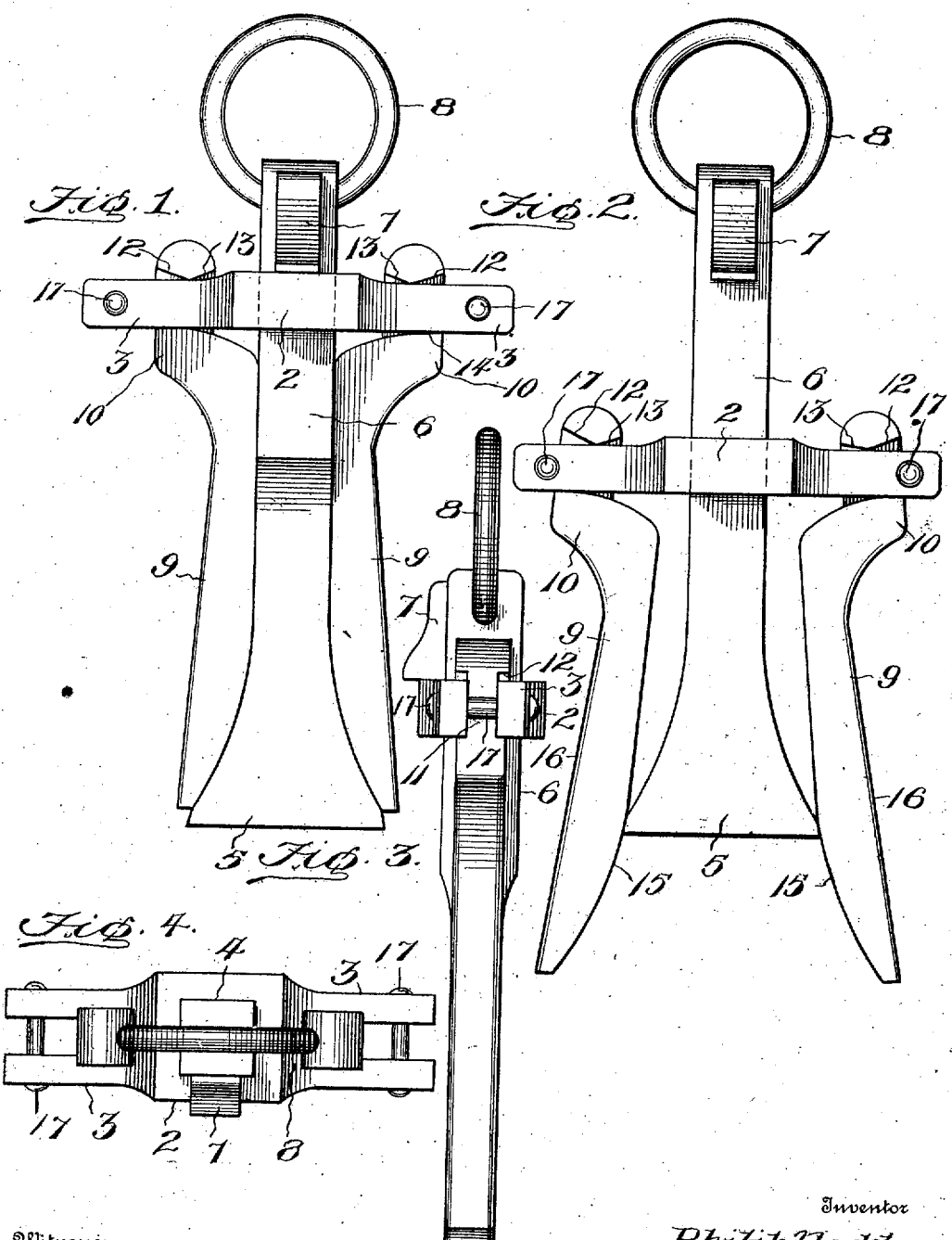

PHILIP NEDDO, OF BARRE, VERMONT.

LEWIS.

No. 884,198.　　　Specification of Letters Patent.　　　Patented April 7, 1908.

Application filed July 23, 1907. Serial No. 385,145.

*To all whom it may concern:*

Be it known that I, PHILIP NEDDO, a citizen of the United States of America, residing at Barre, in the county of Washington and State of Vermont, have invented new and useful Improvements in Lewises, of which the following is a specification.

My invention relates to lewises for lifting stones, and its primary object is to provide a device of this character which is simple of construction, effective in operation, and which may be manufactured and sold at a comparatively low cost.

With the above and other objects in view, the invention consists in the construction, combination and arrangement of parts hereinafter fully described, claimed and illustrated in the accompanying drawing, wherein:—

Figure 1 is a view in side elevation of a lewis constructed in accordance with my invention, the relative position of the parts being that which they are caused to assume before the lewis is placed in engagement with the stone. Fig. 2 is a view similar to Fig. 1, the relative position of the parts being that which they assume when the lewis is sustaining the weight of the stone. Fig. 3 is a view in side elevation, and Fig. 4 is a top plan view.

Referring to the drawings by reference numerals, 2 designates a head which is provided with oppositely projecting pairs of integrally formed arms 3, the arms of each pair being comparatively spaced. The head 2 is also provided with a rectangular opening 4. A substantially wedge-shaped spreader 5 is provided with a rectangular shank 6 adapted to be received by the opening 4, whereby the spreader is slidably mounted upon the head 2. The spreader is prevented from becoming accidentally disengaged from the head 2 by means of a stop 7 which is secured to the shank 6 after the spreader has been applied to the head. A ring 8 is mounted upon the upper end of the spreader and is adapted to have the chain of a hoisting machine secured thereto.

A jaw 9 is pivotally and slidably mounted upon and between each pair of arms 3 through the medium of an offset head 10. The heads 10 are provided with reduced shank portions 11 which are received between the pairs of arms 3. The formations of the shank portions 11 provide upper angular shoulders 12 and 13 and lower shoulders 14. The apices of the shoulders 12 and 13 provide fulcrum points upon which the jaws 9 are supported upon the arms 3. The inner faces 15 of the jaws 9 are formed to conform to the contour of the proximate edges of the spreader 5, while the outer or acting faces 16 thereof are inclined downwardly and laterally in opposite directions. The jaws 9 are prevented from becoming accidentally displaced by means of bolts 17 which extend across the spaces between the pairs of arms 3.

In practice, the stone to be lifted is provided with a socket having undercut end walls. The parts of the lewis are assembled in the relative positions disclosed in Fig. 1 of the drawing, after which the lower end thereof is placed within the socket of the stone. An initial lifting power applied to the spreader 5 imparts thereto a sliding movement with relation to the jaws 9, during which sliding movement the spreader expands the jaws, forcing their acting faces into engagement with the end walls of the socket. When the acting faces of the jaws have been thus brought into engagement with the end walls of the socket, the lewis is securely fastened to the stone and the spreader made rigid with relation to the jaws, whereupon a further upward movement applied to the spreader will lift the stone. The spreading of the jaws causes the extremities of the shoulders 13 and 14 to bind against the upper and lower surfaces of the arms 3, whereby to prevent the jaws from having any lateral movement upon the arms, the lateral adjustment of the jaws upon the arms 3 being provided for the purpose of adapting the lewis for application to sockets of varying lengths.

Having fully described and illustrated my invention, what I claim is:

1. A lewis comprising a head provided with an opening and with oppositely projecting pairs of relatively spaced arms, a jaw provided with a head having a shank portion adapted to be received between each pair of arms, said head being provided with shoulders forming fulcrum points adapted to rest upon the arms, and a spreader provided with a shank portion adapted to project through the opening in the head.

2. A lewis comprising a head provided with an opening and with oppositely projecting pairs of relatively spaced arms, a jaw mounted upon and between each pair of arms, and a spreader provided with a shank portion adapted to project through the opening in the head.

3. A lewis comprising a head provided with an opening and with oppositely projecting arms, jaws mounted upon the arms and a spreader provided with a shank portion projecting through the opening in the head.

4. A lewis comprising a head provided with an opening and with oppositely projecting arms, jaws fulcrumed and slidably mounted upon the arms and a spreader provided with a shank portion projecting through the opening in the head.

In testimony whereof I affix my signature in presence of two witnesses.

PHILIP NEDDO.

Witnesses:
 DAVID POMBRIO,
 BURT H. WELLS.